United States Patent [19]

Sirotkina et al.

[11] 3,987,011
[45] Oct. 19, 1976

[54] METHOD FOR PREPARING POLY-N-ALKENYLAMINES

[76] Inventors: Ekaterina Egorovna Sirotkina, prospekt Lenina, 87, kv. 6; Viktor Dmitrievich Filimonov, ulitsa Usova, 25b, kv. 9; Ljubov Sergeevna Sizova, ulitsa Osipenko, 31, kv. 215; Nina Alexandrovna Tsekhanovskaya, poselok Sputnik, 18, kv. 316, all of Tomsk, U.S.S.R.

[22] Filed: Dec. 16, 1974

[21] Appl. No.: 532,824

Related U.S. Application Data

[63] Continuation of Ser. No. 377,912, July 10, 1973, abandoned.

[52] U.S. Cl. ............................. 260/72.5; 260/67.5; 260/67.6 R; 260/67.8
[51] Int. Cl.$^2$ .................. C08G 12/26; C08G 12/08
[58] Field of Search ............ 260/67.5, 67.6 R, 67.8, 260/72.5

[56] References Cited
UNITED STATES PATENTS

| | | | |
|---|---|---|---|
| 3,244,517 | 4/1966 | Lind | 260/72.5 X |
| 3,770,428 | 11/1973 | Watarai et al. | 260/67.5 X |

*Primary Examiner*—Lucille M. Phynes
*Attorney, Agent, or Firm*—Holman & Stern

[57] ABSTRACT

A method for preparing poly-N-alkenylamines having the following formula (I)

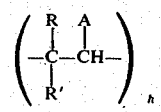

where A is a tertiary aromatic or heterocyclic amine, connected to a carbon atom through nitrogen, R and R' are similar or different hydrogen or lower alkyl, and $n$ is the degree of polymerization, consisting in that the secondary aromatic or heterocyclic amines or their derivatives, for example, diphenylamine, carbazole, phenthiazine, phenoxazine, 3-chloro- and 3,6-dichlorocarbazole are treated with aldehydes having the formula (II) RR'CH-CH=O, where R and R$^1$ are the substances specified above, or their polymers capable of depolymerizing in an acid medium, in the presence of acid catalysts, in organic solvents. The said polymers are prepared by a single-step process without the separation of any intermediate products; the products prepared possess photosensitive properties and can be used, for example, in electrophotography and related processes.

9 Claims, No Drawings

METHOD FOR PREPARING POLY-N-ALKENYLAMINES

This is a continuation of the now abandoned application Ser. No. 377,912, filed July 10, 1972.

The main object of the present invention is to provide a method for preparing poly-N-alkenylamines as represented by general formula (I), where A is a tertiary aromatic or heterocyclic amine connected to the carbon atom through a nitrogen, R and R' are hydrogen or similar or different lower alkyl groups, and $n$ is an integer representing the degree of polymerization.

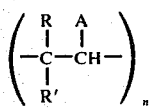

The poly-N-alkenylamines of formula (I), such as poly-N-vinylcarbazole, are known to possess photosensitive properties and find application in diverse information recording and manifolding systems, mostly in electrophotography and related processes.

Methods for preparing poly-N-alkenylamines of the above structure are known in the prior art, where R and R' are H, that is poly-N-vinylamines. Most popular are numerous methods for preparing poly-N-vinylamines by the polymerization of the corresponding N-vinylamines under the action of various catalysts or in their absence, and for example, poly-N-vinylcarbazole, polyvinyldiphenylamine, poly-N-vinylphenthiazine have been polymerized. A few processes for preparing poly-N-vinylamines are also known whereby the reaction between the corresponding amines and vinylacetate react under the catalytic action of mercury salts and strong acids. Low-molecular poly-N-vinylindole, poly-N-vinylcarbazole, poly-N-vinyldiphenylamine were obtained by this method. As far as poly-N-alkenylamines having formula (I), and where both R and R' (or either of them) are alkyl are concerned, they are only known for carbazole and its derivatives. A method for example is known for preparing poly-N-isobutenylcarbazole by the polymerization of N-isobutenylcarbazole. A method for preparing poly-N-propenylcarbazole by a complicated multistep process is also known in the prior art. First proplene oxide acts upon potassium-carbazole in order to obtain 9-β-hydroxypropylcarbazole, which is then polymerized during dehydration.

The disadvantages inherent in the known methods for preparing poly-N-alkenylamines having formula (I), by the polymerization of the corresponding N-alkenylamines, are the intermediate synthesis and thorough purification of the monomers, which markedly complicates the process in order to raise the cost of the end product. This is especially true with the method for preparing poly-N-alkenylamines having formula (I), where R and R' (both, or either of them) are alkyl since the process for preparing the starting monomers consists of several steps as is the case, for example, with the above-named N-propenylcarbazole. The above-named method for preparing poly-N-vinylamines by the reaction between amines and vinyl acetate rules out the step where intermediate monomers are isolated, and thus ensures the preparation of poly-N-vinylamines directly from the amines, which is a less complicated and less expensive method. However, this method possesses a significant disadvantage, namely the use of a toxic mercury catalyst. Moreover, the process only yields poly-N-vinylamines, and it is impossible to prepare other poly-N-alkenylamines corresponding to formula (I) by this process. Furthermore, as far as we know, there is no single method by which various poly-N-alkenylamines having formula (I) can be produced.

The object of this invention is to achieve a single method for preparing poly-N-alkenylamines having formula (I) directly from the corresponding amines by a single-step process without the isolation of any intermediate products and without using any toxic components.

The object has been attained in a method for preparating poly-N-alkenylamines having the general formula

where A is a tertiary aromatic or heterocyclic amine, connected to the carbon atom through the nitrogen, R and R' are hydrogen or similar or different lower alkyl, and n is the degree of polymerization, which, according to the invention, consists in the interaction between secondary aromatic, heterocyclic amines or their derivatives, and aliphatic aldehydes having the general formula RR'CH-CH=O (II), where R and R' are as specified above, or their polymers capable of depolymerizing in an acid medium, in the presence of acid catalysts, in the medium of an organic solvents.

For example, diphenylamine, carbazole, phenthiazine, phenoxazine, and also their nuclei-substituted derivatives, can be used as the said secondary aromatic and heterocyclic amines.

Aliphatic aldehydes corresponding to formula (I) can be acetaldehyde, propionic, butyric and isobutyric aldehydes and the like.

Polymers of acetaldehyde, propionic, butyric and isobutyric aldehydes can be used as the said polymers, but paraldehyde should preferably be used, since it is more suitable than acetaldehyde, which is more volatile. Strong proton-donating acids, such as sulphuric, perchloric, hydrochloric, or mixtures thereof with hydrogen chloride, and also Lewis acids, for example, boron trifluoride etherate, may be used as catalysts in this process. The process can be successfully carried out in a medium of organic solvents of various classes, viz. aliphatic ketones, aromatic and chlorinated aromatic and paraffin hydrocarbons, nitroparaffins, and some others.

The mechanism of the reaction of formation of poly-N-alkenylamines can probably be represented by the following scheme

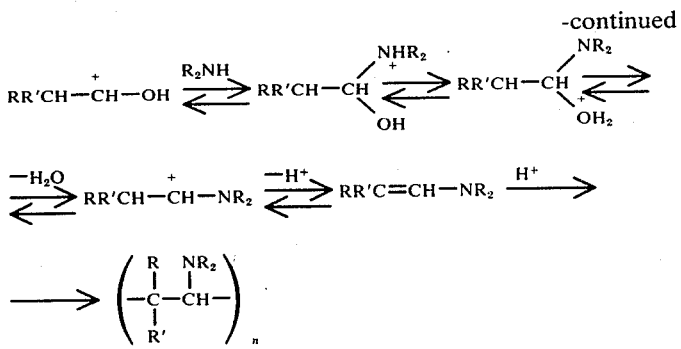

where $R_2NH$ is the above said aromatic or heterocyclic amine.

We have established that some substances, such as carboxylic acids, their anhydrides, and aliphatic alcohols, markedly accelerate the reaction between the said amines and aldehydes, and moreover, somewhat increase the photosensitivity of the polymers formed.

Said carboxylic acids, anhydrides of carboxylic acids, or alcohols, effectively accelerate the process for preparing poly-N-alkenylamines when taken in any proportion, but the optimum effect is attained with their small molar excess with respect to the aldehyde.

The said process can be carried out within a wide range of temperatures, namely from the temperatures close to zero to the boiling point of the solvent used. The said reaction proceeds also at the equimolar amine-to-aldehyde ratio but the most favourable conditions are provided with a small excess of the aldehyde. The resultant poly-N-alkenylamines can be easily isolated by adding the reaction mixture into paraffin hydrocarbons: hexane, petroleum ether, heptane, or into alcohols: methyl, ethyl, isopropyl, or else into water or into water or into water-alcohol mixtures. Poly-N-alkenylamines insoluble in these media are precipitated, separated on a filter, washed, and dried. Poly-N-alkenylamines prepared by the proposed method are thermoplastic powders having molecular weights from 600 to 3,000, well soluble in aromatic hydrocarbons, dioxane, aliphatic ketones, chlorinated hydrocarbons; poorly soluble, or insoluble, in alcohols or paraffin hydrocarbons: and insoluble in water. When a solution of the prepared polymers is evaporated a strong translucent film is formed which possesses photosensitive properties. For example, in films of poly-N-vinylcarbazole, prepared by the proposed method, and having a thickness of 5–15 microns backed by steel or aluminium, the average charge potential is 400 – 600V and the discharge half-time is 3–8 sec at an illumination of 800 lux.

Thus, the advantage of the proposed method for preparing poly-N-alkenyl-amines is the preparation of the end product by a single-step process directly from amines and avoiding any intermediate operations for isolating N-alkenylamines. Inexpensive, readily available, and (what is most important) non-toxic materials that are utilized in the process are another advantage of the proposed method. The method is versatile in that sense that it can be used to prepare poly-N-alkenylamines having the general formula (I) by a single reaction using the corresponding aldehyde. In this connection, the proposed method is of special commercial value, since it can be easily realized on an industrial scale.

For a better understanding of the invention it will be illustrated by examples of its practical embodiment.

EXAMPLE 1

Preparing Poly-N-Vinylcarbazole

A three-necked flask provided with a stirrer and a thermometer is charged with 10 g (0.06 mole) of carbazole, 30 ml of toluene and 3.43 ml (0.026 mole) of paraldehyde. Next, 0.7 ml of a catalyst consisting of a mixture of hydrochloric and perchloric acids (10:2 by volume) is added with stirring to the thus prepared suspension. The solution is heated to 70° C and the reaction is continued at this temperature with stirring for one hour. The toluene solution obtained is then washed with a solution of KOH in a dividing funnel, then with water to neutral reaction, and the-thus treated solution is poured with stirring into 150 ml of isopropyl alcohol. The precipitated polymer is separated on a filter, washed with alcohol, water, and dried. The yield is 9 g (71.5 per cent) of a white amorphous power having a softening point at 125°–133° C, which is well soluble in a majority of organic solvents except alcohols and aliphatic hydrocarbons. The powder forms strong translucent films upon evaporation of the solvent.

Found, N, in per cent: 7.10; calculated, for poly-N-vinylcarbazole, 7.25 ($C_{14}H_{11}N$).

Molecular weight, 600 – 1500.

EXAMPLE 2

Preparing Poly-N-Vinylcarbazole

A three-necked flask provided with a gas-discharge tube, a thermometer and a stirrer is charged with 50 g (0.0299 mole) of carbazole, 250 ml of benzene, 22.3 ml (0.39 mole) of acetaldehyde, and 27.6 ml of ethyl alcohol, the suspension is then cooled to 0° – +5° C and a current of hydrogen chloride is passed into it with constant and intense stirring. The rate of gas passage is adjusted so that the temperature of the reaction mixture does not rise above 10° C. All carbazole is practically dissolved in 20 – 30 minutes. The stirring is continued without the passage of hydrogen chloride for another 15–20 minutes. Then, the benzene solution is filtered, washed two times in a dividing funnel with a solution of soda, and two times with water, and then transferred into one liter of isopropyl alcohol. The precipitated polymer is separated on a filter, washed with alcohol, water and then dried. The yield is 44.7 g (77 per cent) of a white amorphous powder; the softening point is 130° – 140° C; the solubility is similar to that of the polymer prepared in Example 1. Found, N, in per cent: 7.17; the molecular weight is 600–1500.

EXAMPLE 3

Preparing Poly-N-Vinylcarbazole

A three-necked flask provided with a reflux condenser, a stirrer and a thermometer is loaded with 250 g (1.5 mole) of carbazole, one liter of acetone, 86.7 ml (0.695 mole) of paraldehyde and 156 ml of acetic acid. Then 2 ml of sulphuric acid (d=1.84 g/cc) are added dropwise with stirring. The temperature of the reaction mixture is then adjusted to 35° C and the reaction is continued at this temperature for 35–40 minutes until all the carbazole is transferred into solution, after which the solution is stirred for another 20–30 minutes. 12 g of powdered KOH are then added and the mixture is stirred for a few minutes, passed through a filter, and the filtrate is added with stirring into 3.5 liters of isopropyl alcohol. The precipitated polymer is separated on a filter, washed with alcohol and water, and dried. The yield is 129 g (45 per cent) of a white amorphous powder. The properties of the obtained polymer are similar to those inherent in the polymer prepared in Example 2.

EXAMPLE 4

Preparing Poly-N-Vinylcarbazole

A flask provided with a stirrer, a thermometer, and a reflux condenser is loaded with 10 g (0.06 mole) of carbazole, 30 ml of toluene, 3.43 ml of paraldehyde, 3.75 ml of acetaldehyde, and finally, 0.6 ml of a catalyst consisting of a mixture of hydrochloric and perchloric acid (10:1 by volume) is added to the stirred mixture. The reaction mixture is heated to 55° C and the reaction is continued with stirring for one hour. The thus obtained solution is washed with a solution of alkali, then with water, and then poured with stirring into 150 ml of petroleum ether. The precipitated polymer is separated by filtration, washed with alcohol, water, and dried. The yield is 8.8 g (70.5%) of a white amorphous powder; the softening point is 130°–145° C; the solubility of the product is similar to that of the polymer prepared in Example 1. Found in per cent is 7.19N.

The molecular weight is 600–1500.

EXAMPLE 5

Preparing Poly-N-Butenylcarbazole

A flask provided with a stirrer and a thermometer is charged with 10 g (0.06 mole) of carbazole, 30 ml of toluene, 6.34 ml (0.072 mole) of butyric anhydride, and then 0.7 ml of a catalyst consisting of a mixture of hydrochloric and perchloric acid (10:1 by volume) is added to the prepard suspension with stirring. Then, at a temperature of 85°–90° C, the reaction mixture is stirred for four hours. The non-dissolved carbazole (about 7 g) is separated by filtration and the filtrate is poured into 400 ml of isopropyl alcohol. The precipitated polymer is separated on a filter, washed with alcohol, water, and then dried The yield is 1 g (7.3 per cent) of a creamy amorphous powder; the softening point is 220°–230° C; the solubility is similar to that of the polymer prepared in Example 1. Found is 6.10 percent N, and that calculated for poly-N-butenyl-carbazole 6.30 ($C_{16}H_{16}N$). The molecular weight is 1500–2500.

EXAMPLE 6

Preparing Poly-N-Butenylcarbazole

The reaction is carried out as described in Example 5 with the addition of 6.02 ml of acetic acid to the reaction mixture. At a temperature of 85° C the reaction mixture is stirred for one hour. The reaction mixture is then passed through a filter in order to separate a small quantity of the non-dissolved carbazole, and the filtrate is poured while stirring into a mixture consisting of 350 ml of isopropyl alcohol, 100 ml of water and about 1 g of sodium chloride (which is added to improve the conditions for the coagulation of the polymer). The precipitated polymer is separated on a filter, washed with alcohol and water, and dried. The yield is 3 g (22.5 per cent) of a creamy amorphous powder, having a softening point of 200°–210° C. The solubility of the polymer is similar to that of the polymer prepared in Example 1. Found is 6.13 percent N. The molecular weight is 1500–2500.

EXAMPLE 7

Preparing Poly-N-Butenylcarbazole

The reaction is carried out similarly to that of Example 5, with addition of 3.75 ml of acetaldehyde to the reaction mixture. The reaction mixture is stirred for one hour at 85° C. The reaction mixture is then separated on a filter from the non-reacted carbazole (about 2.5 g) and the filtrate is poured with stirring into 150 ml of heptane, whereupon the precipitated polymer is separated on a filter, washed with alcohol and water, and then dried. The yield is 3.6 g (27 per cent) of a creamy amorphous powder having a softenining point of 170°–180° C; the solubility of the product is similar to that of the polymer prepared in Example 1. The percent N found is 6.21, and the molecular weight is 1000–2000.

EXAMPLE 8

Preparing Poly-N-Butenylcarbazole

The reaction is carried out as described in Example 5, except that 6.88 ml of isopropyl alcohol is added to the reaction mixture. At a temperature of 85° C, the reaction mixture is stirred for three hours, then it is passed through a filter in order to separate 3.2 g of non-dissolved carbazole, and the filtrate is poured into 200 ml of isopropyl alcohol. The precipitated polymer is separated on a filter, washed with alcohol and water, and then dried. The yield is 3.5 g (26 per cent) of a creamy amorphous powder having a softenining point of 210°–220° C. The solubility of the product is similar to that of the polymer obtained in Example 1. The product is found to contain 6.15 percent N, and the molecular weight is 1500–2500.

EXAMPLE 9

Preparing Poly-N-Butenylcarbazole

The reaction is carried out as in example 5, except that 5.25 ml of ethyl alcohol are added to the reaction mixture. At a temperature of 85° C, the reaction mixture is stirred for three hours. The reaction mixture is separated from 2.5 – 3 g of the non-reacted carbazole, the filtrate is poured with stirring into 150 ml of heptane, and the precipitated polymer is separated on a filter, washed with alcohol and water, and then dried. The yield is 5.5 g (40.5 per cent) of a pale-brown amorphous powder, softening at 180°–200° C. The solubility of the product is similar to that of the polymer prepared in Example 1. Found in per cent is 6.19N.

Molecular weight, 1000–2500.

EXAMPLE 10

Preparing Poly-N-Vinylphenthiazine

A mixture of 15 g (0.075 mole) of phenthiazine, 4.9 ml of acetaldehyde, 5.6 ml of acetic acid and 0.25 ml of sulphuric acid in 60 ml of benzene is heated in a hermetically sealed flask with periodic shaking for two hours at a temperature of 60° C. The reaction mixture is separated from the non-reacted phenthiazine on a filter, and the filtrate is poured into 200 ml of isopropyl alcohol. The precipitated polymer is separated on a filter, washed with alcohol and water, and dried. The yield is 10.8 g (64 per cent) of a pale-grey amorphous powder having the softening point at 165°–170° C. The solubility of the polymer is similar to that of the product prepared in Example 1. Found in percent is 6.71 N, and that calculated for poly-N-vinylphenthiazine, 6.20 ($C_{14}H_{11}NS$). The molecular weight is 1500–2000.

EXAMPLE 11

Preparing Poly-N-Vinylphenoxazine 1 g (0.00546 mole) of phenoxazine and 10 ml of benzene are mixed with 0.19 ml (0.0014 mole) of paraldehyde and 0.06 ml of sulphuric acid (d=1.84 g/cc), after which the reaction mixture is heated in a sealed flask with periodical shaking the contents for five hours. The thus-formed solution is poured into 60 ml of heptane, and the precipitated polymer is separated on a filter, washed with alcohol, water, and dried. The yield is 0.1 g (10 per cent) of a pale-green amorphous powder having the softening point of 230°–240° C. The solubility of the product is similar to that of the polymer prepared in Example 1. Found, N, in per cent; 6.50; calculated for poly-N-vinylphenoxazihe, 6.74 ($C_{14}H_{11}NO$). Molecular weight, 1500 – 3000.

EXAMPLE 12

Preparing Poly-N-Vinyl-3-Chlorocarbazole

A three-necked flask provided with a gas-discharge tube and a thermomter, is charged with 20.2 g (0.1 mole) of 3-chlorocarbazole, 400 ml of benzene, 8.5 (mole) of acetaldehyde and 14.2 ml of ethyl alcohol. The components are stirred for 35 minutes during which a current of dry hydrogen chloride is passed at such a rate that the reaction temperature is maintained at 10°–12° C. The solution is then poured into 1.5 liters of isopropyl alcohol with intense stirring, and the precipitated polymer is separated on a filter, washed with alcohol and water, and dried. The yield is 11.05 g (49 per cent of a white amorphous powder, having a softening point at 135°–140° C. The solubility of the product is similar to that of the polymer prepared in Example 1. Found, N, in per cent: 6.31; Cl in per cent: 15.6. Calculated, for that of poly-N-vinyl-3-chlorocarbazole is 6.15 and 15.38 respectively ($C_{14}H_{10}NCl$). Molecular weight, 1000–2500.

EXAMPLE 13

Preparing Poly-N-Vinyl-3,6-Dichlorocarbazole 4.75 g (0.02 mole) of 3,6-dichlorocarbazole in 20 ml of benzene added are mixed with 0.93 ml (0.007 mole) of paraldehyde, 2.4 ml of acetic acid and 0.25 ml of sulphuric acid (d=1.84 g/cc). The mixture is kept at a temperature of 50° C with stirring for two hours. The reaction mixture is then poured into 150 ml of petroleum ether, the precipitated polymer is separated on a filter, washed with alcohol and water, and dried. The yield is 3.3 g (62.5 per cent) of a pale-grey amorphous powder having a softening point at 155°–165° C. The solubility of the product is similar to that of the polymer prepared in Example 1. Found, N, in per cent: 5.20; Cl, in per cent: 27.32. Calculated for that of poly-N-vinyl-3,6-dichlorocarbazole is 5.36 and 26.80 respectively. ($C_{14}H_9NCl_2$). Molecular weight is 1000–2000.

We claim:

1. A method for preparing thermoplastic poly-N-alkenylamines having the general formula

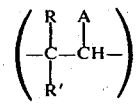

where A is a tertiary heterocyclic amine, connected to the carbon atom through the nitrogen, R and R' are selected from the group consisting of hydrogen and lower alkyl, and n is the degree of polymerization, comprising reacting a secondary heterocyclic amine or derivatives thereof, with an aldehyde having the general formula RR'CH-CH=O, where R and R' are the substituents as specified above, or polymers thereof capable of depolymerizing in an acid medium, in the presence of an acid catalyst, and in an organic solvent.

2. A method according to claim 1, wherein said secondary amine is selected from the group consisting carbazole, phenthiazine, phenoxazine, 3-chloro- and 3,6-dichlorocarbazoles, or derivatives, thereof.

3. A method according to claim 1, wherein said aldehyde is selected from the group consisting of acetaldehyde, propionic aldehyde, butyric aldehyde and isobutyric aldehyde.

4. A method according to claim 1, wherein paraldehyde is used as the aldehyde.

5. A method according to claim 1, wherein strong proton-donating acids and Lewis acids selected from the group consisting of sulphuric, perchloric, hydrochloric acids, mixtures thereof, and the etherate of boron trifluoride are used as the catalysts.

6. A method according to claim 1, wherein the organic solvent is selected from the group consisting of aliphatic ketones, aromatic and chlorinated paraffin and aromatic hydrocarbons, nitroparaffins and dioxane.

7. A method according to claim 1, further comprising reacting said secondary amine and said aldehyde in the presence of an accelerator selected from the group consisting of carboxylic acids, anhydrides of carboxylic acids and aliphatic alcohols.

8. A method according to claim 1, wherein said secondary amine is selected from the group consisting of carbazole, 3-chlorocarbazole, and 3,6-dichlorocarbazole.

9. A method according to claim 8, wherein said aldehyde is monomeric.

\* \* \* \* \*